US 9,082,142 B2

(12) United States Patent
Svetal

(10) Patent No.: US 9,082,142 B2
(45) Date of Patent: Jul. 14, 2015

(54) USING A MOBILE DEVICE TO ASSIST IN EXCEPTION HANDLING IN SELF-CHECKOUT AND AUTOMATED DATA CAPTURE SYSTEMS

(71) Applicant: Datalogic ADC, Inc., Eugene, OR (US)

(72) Inventor: Michael P. Svetal, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 13/737,805

(22) Filed: Jan. 9, 2013

(65) Prior Publication Data

US 2013/0175339 A1    Jul. 11, 2013

Related U.S. Application Data

(60) Provisional application No. 61/584,627, filed on Jan. 9, 2012.

(51) Int. Cl.
*G06K 15/00* (2006.01)
*G06Q 30/06* (2012.01)
*G06Q 10/00* (2012.01)
*G07G 1/14* (2006.01)

(52) U.S. Cl.
CPC ........... *G06Q 30/06* (2013.01); *G06Q 10/20* (2013.01); *G07G 1/14* (2013.01)

(58) Field of Classification Search
CPC . G07G 1/0054; G07G 1/0045; G06K 7/1443; G06K 7/10722
USPC .................. 235/383, 462.08, 462.11, 462.31
See application file for complete search history.

(56) References Cited

U.S. PATENT DOCUMENTS

| | | | |
|---|---|---|---|
| 4,679,154 A * | 7/1987 | Blanford | 235/383 |
| 4,850,009 A | 7/1989 | Zook et al. | |
| 5,525,786 A * | 6/1996 | Dumont | 235/462.14 |
| 5,572,019 A | 11/1996 | Sukuma | |
| 5,641,039 A * | 6/1997 | Dumont | 186/61 |
| 6,687,680 B1 * | 2/2004 | Iguchi et al. | 705/16 |
| 7,010,501 B1 | 3/2006 | Roslak et al. | |
| 7,040,455 B2 * | 5/2006 | Bogat | 186/61 |
| 7,207,477 B1 | 4/2007 | Ramachandran | |
| 7,209,891 B1 * | 4/2007 | Addy et al. | 705/21 |

(Continued)

FOREIGN PATENT DOCUMENTS

| | | |
|---|---|---|
| JP | 2006309264 A | 11/2006 |
| WO | WO 2007038348 A1 * | 4/2007 ............... G06K 7/00 |

OTHER PUBLICATIONS

Evolution Robotics: Brochure: ViPR® Giving Products the Ability to See, downloaded from https://web.archive.org/web/20100710090822/http://www.evolution.com/core/ViPR/ (Internet Archive date Jul. 2010) visited Oct. 31, 2013.

(Continued)

*Primary Examiner* — Paultep Savusdiphol
(74) *Attorney, Agent, or Firm* — Stoel Rives LLP

(57) ABSTRACT

Self checkout and automated checkout systems and methods for multiple lane checkout stations, the automated checkout lane having a conveyor system that automatically transport objects through a portal data reader, wherein an operator (such as a checkout clerk) is provided with a portable/handheld data input and display device that allows the operator to move between multiple checkout stations for handling reading exceptions at the checkout station by employing the portable device.

17 Claims, 3 Drawing Sheets

(56) References Cited

U.S. PATENT DOCUMENTS

| | | | |
|---|---|---|---|
| 7,325,729 B2* | 2/2008 | Crockett et al. | 235/383 |
| 7,461,785 B2* | 12/2008 | Crockett et al. | 235/383 |
| 7,660,739 B2 | 2/2010 | Fowler | |
| 7,909,248 B1* | 3/2011 | Goncalves | 235/383 |
| 8,068,674 B2* | 11/2011 | Goncalves | 382/194 |
| 8,196,822 B2* | 6/2012 | Goncalves | 235/383 |
| 8,430,311 B2* | 4/2013 | Ostrowski et al. | 235/383 |
| 2003/0047387 A1* | 3/2003 | Bogat | 186/59 |
| 2006/0131402 A1* | 6/2006 | Crockett et al. | 235/383 |
| 2006/0243798 A1* | 11/2006 | Kundu et al. | 235/383 |
| 2006/0261157 A1* | 11/2006 | Ostrowski et al. | 235/383 |
| 2007/0057049 A9* | 3/2007 | Kundu et al. | 235/383 |
| 2008/0011846 A1* | 1/2008 | Cato | 235/435 |
| 2008/0048029 A1* | 2/2008 | Crockett et al. | 235/383 |
| 2008/0078833 A1* | 4/2008 | Crockett et al. | 235/383 |
| 2008/0116278 A1 | 5/2008 | Epshteyn | |
| 2008/0308630 A1 | 12/2008 | Bhogal et al. | |
| 2009/0021375 A1* | 1/2009 | Stagg | 340/572.1 |
| 2011/0060426 A1* | 3/2011 | Morton | 700/73 |
| 2011/0075931 A1* | 3/2011 | Chiou et al. | 382/190 |
| 2011/0191196 A1 | 8/2011 | Orr et al. | |
| 2011/0279272 A1* | 11/2011 | Wieth et al. | 340/568.5 |
| 2011/0320296 A1* | 12/2011 | Edwards | 705/23 |
| 2013/0020391 A1 | 1/2013 | Olmstead et al. | |
| 2013/0020392 A1 | 1/2013 | Olmstead et al. | |

OTHER PUBLICATIONS

U.S. Appl. No. 13/357,459, Olmstead et al., Exception Detection and Handling in Automated Optical Code Reading Systems, filed Jan. 24, 2012.

U.S. Appl. No. 13/357,356, Olmstead et al., Tunnel or Portal Scanner and Method of Scanning for Automated Checkout, filed Jan. 24, 2012.

* cited by examiner

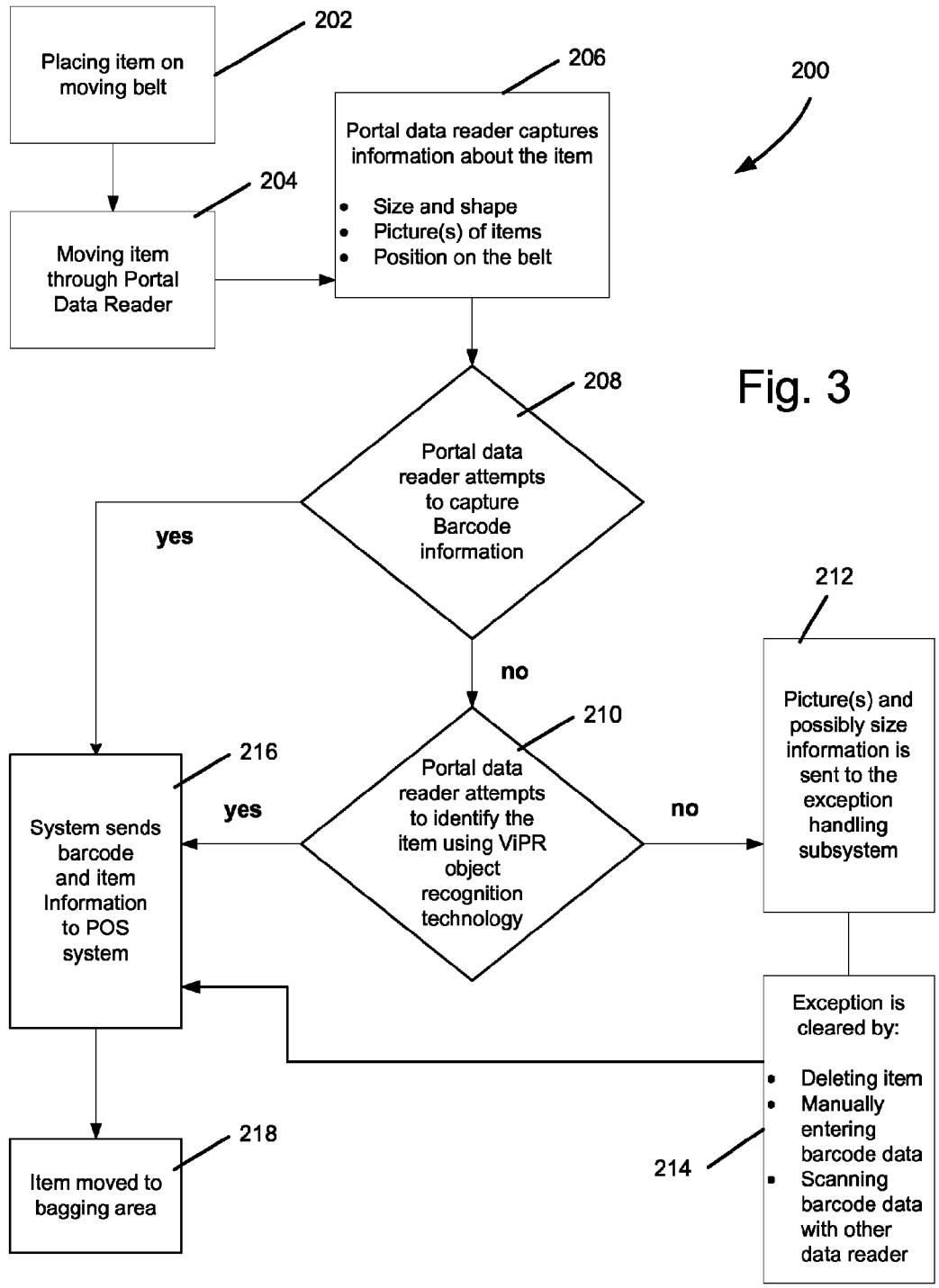

USING A MOBILE DEVICE TO ASSIST IN EXCEPTION HANDLING IN SELF-CHECKOUT AND AUTOMATED DATA CAPTURE SYSTEMS

RELATED APPLICATION DATA

This application claims the benefit under 35 U.S.C. §119(e) of U.S. Provisional Patent Application No. 61/584,627, filed Jan. 9, 2012, which is hereby incorporated by reference.

BACKGROUND

The field of this disclosure relates generally to systems and methods of data reading, and more particularly but not exclusively to reading optical codes (e.g., barcodes).

Optical codes encode useful, optically-readable information about the objects to which they are attached or otherwise associated. Perhaps the best example of an optical code is the barcode. Barcodes are found on or associated with objects of various types, such as the packaging of retail, wholesale, and inventory goods; retail product presentation fixtures (e.g., shelves); goods undergoing manufacturing; personal or company assets; and documents. By encoding information, a barcode typically serves as an identifier of an object, whether the identification be to a class of objects (e.g., containers of milk) or a unique item.

Various types of optical code readers, also known as scanners, such as manual readers, semi-automatic readers and automated readers, are available to acquire and decode the information encoded in optical codes. In a manual reader (e.g., a hand-held type reader, or a fixed-position reader), a human operator positions an object relative to the reader to read the optical code associated with the object. In a semi-automatic reader, either checker-assisted or self-checkout, objects are moved one at a time by the user into or through the read zone of the reader and the reader then reads the optical code on the object. In an automated reader (e.g., a portal or tunnel scanner), an object is automatically positioned (e.g., transported through the read zone via a conveyor) relative to the reader, with the reader automatically reading the optical code on the object.

When an optical code reader attempts to read an optical code on an object, certain read errors may occur, or the reader may fail to read the optical code. For example, when a read error or read failure occurs with a manual or semi-automatic reader, the human operator typically rescans the optical code or manually enters (e.g., via a keyboard) a number (e.g., a UPC number) corresponding to the object. In an automated self-checkout reader, the reader needs to determine automatically whether an error or an unexpected event occurs and if such an error or unexpected event occurs take appropriate exception action. Accordingly, the present inventor has recognized a need to accurately identify and handle read errors or read failures and unexpected events that may occur in automated readers.

BRIEF DESCRIPTION OF THE DRAWINGS

FIG. 3 is a flowchart of a process performed by an exception handling system of the automated optical code reading system of FIG. 1.

DETAILED DESCRIPTION OF DISCLOSED EMBODIMENTS

With reference to the above-listed drawings, this section describes particular embodiments and their detailed construction and operation. The embodiments described herein are set forth by way of illustration only and not limitation. It should be recognized in light of the teachings herein that other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to skilled persons in light of the teachings herein and/or where such detail would obfuscate an understanding of more pertinent aspects of the embodiments.

Various imager-based optical code readers and associated methods are described herein. In some embodiments, improved automatic imager-based optical code readers are described for identifying and handling exceptions. Various types of exceptions are described in more detail below.

Figure 1:
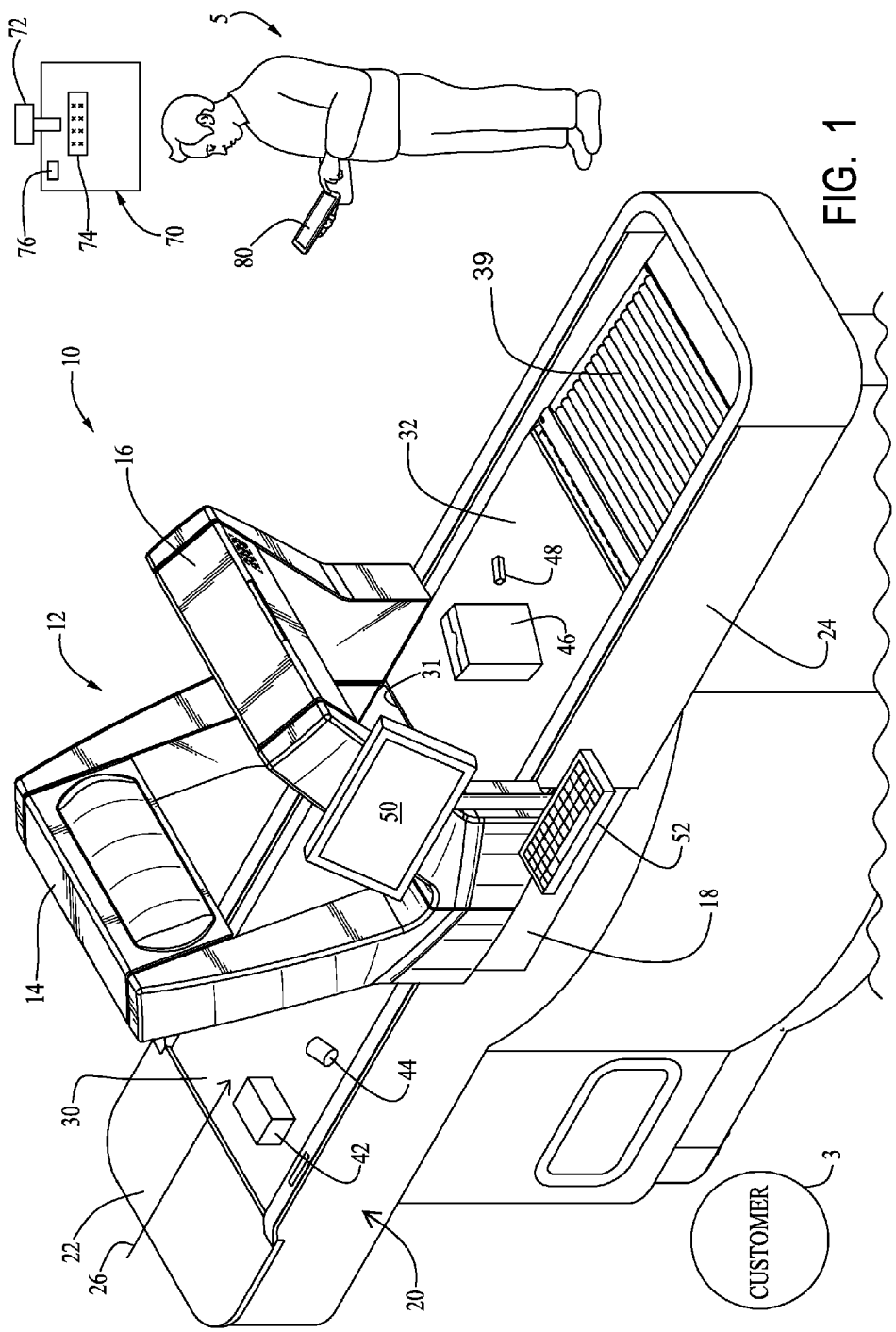
FIG. 1 is an isometric view of an automated optical code reading system according to one embodiment.

FIG. 1 illustrates an automated reader system in the form of a portal or tunnel checkout system 10 according to one example. The system 10 includes a portal scanner unit 12 installed on a checkout counter unit 20. The portal data reader unit 12 includes front and rear arch sections 14, 16 and bottom scanner section 18. The checkout counter unit 20 includes an inlet end 22 and outlet end 24, and a conveyor comprising an inlet conveyor section 30 and an outlet conveyor section 32. Items such as package/box 42 and can 44 are placed on the inlet conveyor section 30 and transported in the direction of direction arrow 26 through the interior of the portal data reader unit 12 and then transported out of the interior via outlet conveyor section 32. The conveyor system 30/32 may include one or more various types of mechanical conveying systems to move objects through a three-dimensional view volume of the data reader so that optical codes disposed on the objects can be read and the objects added to an item transaction list. The conveyor system 30/32 may include one or more conveyors. In one example, the conveyor system 30/32 is operable to move items in the longitudinal direction (shown by arrow 26) at a relatively fast rate (e.g., 200-400 millimeters/second (mm/sec)) so that objects can be quickly added to the item transaction list.

The conveyor system 30/32 moves items relative to portal data reader 12, the portal data reader 12 having has multiple data capture devices 14, 16 that form arches over a central portion of the conveyors 30/32. Data capture devices 14, 16 include various components operative to capture information corresponding to the objects that are moved through the arches. Although the data capture devices 14, 16 are illustrated as including an open space between them, the data capture devices 14, 16 may be embodied in an enclosed elongated tunnel formed over or around the conveyors 30/32. The portal data reader 12 may thus be partially open and partially enclosed, such as the example illustrated in FIG. 1, or fully enclosed such as via a tunnel enclosure. The configuration of the dual arches 14, 16 creates an open architecture that provides some barrier/inhibition from a customer reaching into the read zone yet provide sight lines for allowing the customer to generally continuously observe items passing through the arches. A portal scanner need not include any tunnel or even semi-enclosed arches, but a suitable portal scanner may be constructed with more or less openness.

The data reader 12 may also include a bottom reader section 18 that reads the bottom side of items as they are passed over the gap 31 between the front/upstream conveyor section 30 and the rear/downstream conveyor section 32. Details of an example data capture system are further described in U.S. Patent Application No. 61/435,777, filed Jan. 24, 2011 and application Ser. No. 13/357,356 filed Jan. 24, 2012, each of which is incorporated herein by reference.

Figure 2:
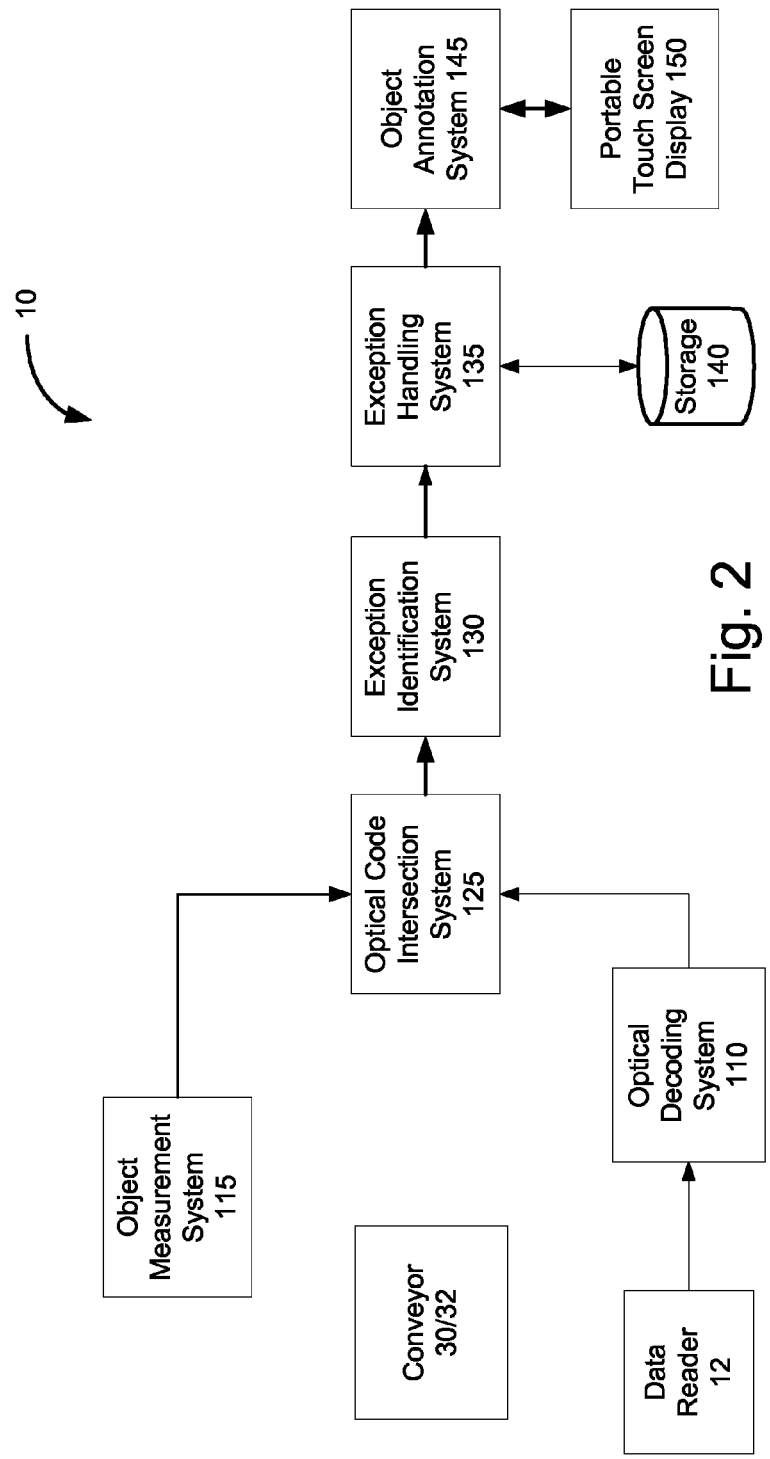
FIG. 2 is a block diagram of an automated optical code reading system according to one embodiment.

FIG. 2 is a block diagram illustrating components of the automated optical code reading system 10 of FIG. 1 according to one embodiment. The system 10 includes (1) a conveyor 30/32 that moves items 42-48 through the read zone of the data reader arch sections 14, 16; (2) a data reader 12 that reads optical codes disposed on the items; (3) a decoding system 110 that processes and decodes the signal acquired by the data reader; (4) an exception identification system operable to identify when an exception occurs. An ideal event corresponds to when the system 10 successfully reads an optical code and confidently associates the optical code to an object passing through the read zone of the data reader 12 (e.g., the optical code is associated with only one object and the object has only one optical code associated with it). Other instances are not so ideal and thus various types of exceptions are possible. For example, one type of exception corresponds to an event in which an object passes through the arch sections 14/16, but an optical code is not read by the reader 12. Another type of exception corresponds to an event in which an optical code is read, but system 10 does not detect that an object has passed through the system 10. Another type of exception corresponds to an event in which one optical code read by the data reader 12 is associated with multiple objects passing through system 10. Another type of exception corresponds to an event in which multiple different optical codes read by system 10 are associated with one object passing through system 10. Various subsets of the above-described exceptions, as well as other types of exceptions, are possible and applicable to the systems/methods described herein.

System 10 includes various modules or subsystems to perform various tasks. These subsystems are described in greater detail below. One or more of these systems may include a processor, associated software or hardware constructs, and/or memory to carry out certain functions performed by the systems. The processors of the systems may be embodied in a single central processing unit, or may be distributed such that a system has its own dedicated processor. Moreover, some embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

The optical code reader 12 is operable to capture images of objects as the objects are transported along conveyor system 30/32. The optical code reader 12 identifies whether optical codes disposed on the objects are captured in the images and decodes those optical codes that are captured. The optical code reader 12 may include different decoders (e.g., software algorithms, hardware constructs) to decode various types of optical codes including one-dimensional (e.g., linear) codes (e.g., UPC, codabar, code 25, code 39, code 93, code 128, code 11, EAN8, EAN13, plessey, POSTNET) and two-dimensional (e.g., matrix) codes (e.g., aztec code, maxicode, QR code, high-capacity color barcode, data matrix). The system 10 may optionally include a separate optical decoding system 110 that receives and decodes the signal from the data reader 12.

The system 10 may include any of a number of suitable exception detection/determination systems. In one example exception detection system, an object measurement system 115 is positioned along conveyor system 30/32 to measure objects that are transported along conveyor system 30/32. In one example configuration, the object measurement system 115 generates model data that represent three-dimensional models of the objects that are transported along conveyor system 30/32. Further details of this object measurement system 115 are described in U.S. Application No. 61/505,935 and Ser. No. 13/357,459 hereby incorporated by reference.

The optical code reading system 12 is also operable to generate projection data for optical codes represented in the images it captures. The projection data represent back projection rays that project into a three-dimensional view volume of optical code reading system 12. These back projection rays are associated with locations of the representations of the optical codes in the images. Details of example optical code reading system 12 are described in U.S. Application No. 61/435,777 and Ser. No. 13/357,356 hereby incorporated by reference.

The system 10 may also include an optical code intersection system 125 that is configured to receive the model data from object measurement system 115 and the projection data from optical code reading system 12. The optical code intersection system 125 uses the model data and the projection data to determine whether the back projection rays generated for decoded optical codes intersect with the three-dimensional models. Details of the optical code intersection system 125 are described in U.S. Application No. 61/505,935 and Ser. No. 13/357,459 hereby incorporated by reference.

The system 10 may include an optional exception identification system 130 in communication with the optical code intersection system 125. The exception identification system 130 identifies whether exceptions occur based on intersection determinations made by the optical code intersection system 125. For example, if an object passes through system 100 and the object measurement system 115 generates a three-dimensional model of the object, but no back projection ray of an optical code intersects with the three-dimensional model, exception identification system 130 identifies this event as an exception. The exception identification system 130 is also operable to classify and categorize exceptions by types and subtypes and to generate exception category identification information indicative of the exception types and/or subtypes. The system 10 may also include (a) an optical decoding system 110 that receives and decodes the signal from the data reader 12 and (b) an object measurement system 115 positioned along conveyor system 30/32 to measure objects that are transported along conveyor system 30/32. In one example configuration, an object measurement system 115 generates model data that represent three-dimensional models of the objects that are transported along conveyor system 30/32. Further details of the object measurement system 115 are described in U.S. Application No. 61/505,935 and Ser. No. 13/357,459 hereby incorporated by reference.

The system 10 may also include an optional exception handling system 135 in communication with exception identification system 130. The exception handling system 135 determines in what manner to handle (e.g., resolve) an exception identified by the exception identification system 130 based on the exception's type. To this end, the exception category identification information generated by the exception identification system 130 is communicated to the exception handling system 135. The exception handling system 135 is operable to determine that an exception should be resolved in one of multiple ways. For example, the exception handling system 135 may determine that an exception is to be automatically resolved by ignoring the exception or manually resolved by an operator. The exception handling system 135 may communicate with an optional storage device 140 that stores various types of information associated with exceptions. The system 10 may also include an optical decoding system 110 that receives and decodes the signal from the data reader 12 and an object measurement system 115 positioned along conveyor system 30/32 to measure objects that are transported along conveyor system 30/32. In one example configuration, the object measurement system 115 generates model data that represent three-dimensional models of the objects that are transported along conveyor system 30/32. Further details of the object measurement system 115 are described in U.S. Application No. 61/505,935 and Ser. No. 13/357,459 hereby incorporated by reference.

The system 10 may also include an optional object annotation system 145 that is operable to generate annotated image data corresponding to visual representations of exceptions to enable an operator to easily identify which objects that are transported through system 100 have exceptions associated with them. The annotated image data generated by object annotation system 145 are communicated to a display screen 150, which displays the visual representations of the exceptions. Further details of the object annotations system 145 are described in U.S. Application No. 61/505,935 and Ser. No. 13/357,459 hereby incorporated by reference.

Once the exception identification system 130 identifies an exception and generates the exception category identification information, the exception handling system 135 determines how to resolve the exception. Exceptions can be resolved in various ways such as ignore the exception, automatically resolve the exception, and/or manually resolve the exception (either by the user 3 or the clerk 5). The exception handling system 135 may be user-programmable to handle various exceptions in different ways.

In an example process of using the automated data capture system 10, the customer 3 places items on a moving belt which transports the items through the data reader 12 and then to one or more bagging areas 39. If the data capture process is determined to not have been successful for any reason (i.e., that an exception has occurred) then information about this failed attempt to capture the data is communicated to the user/customer 3 or to the checkout clerk 5 so that the exception can be managed. One method for communicating this exception information is to provide one or more images (digital photographs) of the item, a video of the item, a 3D image of the item that can be rotated, and data that was captured but that was too ambiguous to determine if the data was correct. Typically, this (ambiguous) data is communicated or displayed to a user/customer 3 via a fixed display screen 50, which may comprise a touch screen. The user reviews the information on the fixed screen 50 and interacts with the screen via a keyboard/keypad 52 and/or touch screen 50 or other input device. The system 10 may also include a payment receipt system (such as a card reader or cash receiver disposed with the keyboard 52 or touch screen 50 or elsewhere) to enable the customer to insert/swipe a credit card or insert cash for payment.

In certain checkout systems, a number of automated (or semi-automated) checkout stations 10 may be serviced by a checkout clerk 5, typically seated or standing at a fixed clerk station 70. The clerk station 70 includes a video screen 72 (which may be a touch screen or not) on which images and messages pertaining to exceptions (as well as other information) are displayed. The clerk station may also include a keyboard 74 and/or touch screen 72 for inputting and interacting with the checkout stations 10.

In an alternate communication method, the checkout clerk 5, who may provide support for multiple checkout counters 10, is provided with a portable/mobile handheld device 80 that also provides the display for the exception information from the checkout stations 10. Though the device 80 may be wired/corded, it is preferably wireless to provide maximized (untethered) mobility. The mobile device 80 may optionally have a means for capturing the data from the item. Examples of such device would be laser or imaging handheld scanner with built in displays, PDA's (Portable Digital Assistant), mobile computers, cell phones, cell phones with image capture capability (a.k.a., Smart phones), computer tablet, touch screen computers. As an extension, clerk station 70 may include a fixed mounting platform (such as a docking station 76) for the mobile display data capture device 80 such that when inserted into the dock, the device 80 may (1) connected for charging and (2) self-supporting at a convenient location for visual use by the clerk 5. The mobile display data capture device may allow the clerk/user 5 to have maximum mobility when handling the exception items of the automated checkout system 10.

The mobile device 80 may be provided with suitable security features. For example, the mobile device may require password and employee sign-in procedures and communication encryption protocols. To prevent removal, the mobile device 80 may include (a) an electronic article security device that would set off an alarm if the device is attempted to be removed through the store exit detectors or (b) so-called wireless handcuffs such as described in U.S. Pat. No. 5,572,019 hereby incorporated by reference. The mobile device 80 may include a keyboard/keypad for character and data input, but preferably includes a touch screen display provided with a virtual keyboard.

The mobile device 80 provides maximum mobility to the clerk/user who is handling the exceptions of the automatic data capture device. The user also has the ability to handle (and approach) multiple checkout stations 10 with a single exception indicating/handling mobile device 80.

FIG. 3 is a flowchart of an exception handling method according to one embodiment, comprising the following steps.

Step 202, placing item(s) on the moving conveyor.

Step 204, via the conveyor, moving the item through a read region of the portal data reader.

Step 206, via the portal data reader, capturing information about the item:
 object size and shape;
 capturing a picture/image of the item;
 position of the item on the conveyor.

Step 208, via the portal data reader, attempting to capture optical code information from the item. If successful in capturing and reading/decoding, proceeding to Step 216; if unsuccessful, proceeding to Step 210. The portal data reader may include a separate optical code reading mechanism, or the image(s) captured of the item may be processed to detect and decode optical code(s) present in the images.

Step 210, via the portal data reader, attempting to identify the item using object recognition techniques such as ViPR® object recognition technology available from Datalogic ADC, Inc. of Eugene Oreg., this type of object recognition employing scale-invarient feature transformation (SIFT) type object recognition. If YES, proceeding to Step 216; if NO, proceeding to Step 212 (Exception handing).

Step 212, from an unsuccessful identification at Step 210, sending exception information (such as digital photographs and item size information) to the exception handling subsystem (Step 214) for handling.

Step 214, clearing the exception by:
deleting the item from the transaction and providing instructions to the customer 3;
manually entering optical code data either from direct view of the item itself, or optionally by examining the digital photograph of the item;
scanning the optical code on the item with another data reader such as one incorporated into the mobile device 80. Once the exception is cleared, proceeding to Step 216.

Step 216, from a successful item identification from either Step 208 or Step 210, or successful exception clearance at Step 214, sending optical code and/or item information to the POS system; proceeding to Step 218.

Step 218, via the downstream conveyor section 32, moving the item to the bagging area.

Information corresponding to the way in which the operator resolves the exception may be stored in storage device 140 for use by exception handling system 135. Additionally, the exception category identification information may be stored in storage device 140.

When exception handling system 135 determines that the exception should be automatically resolved, the exception can be resolved in various ways. For example, the exception can be ignored. In another example, conveyors 110 can be stopped and/or reversed so that the object can travel through the read volume again. In another example, an alternative system, such as an object recognition system that uses extracted visual features (e.g., scale-invariant features, such as scale-invariant feature transformation (SIFT) features), or other object recognition techniques, to identify an object, or an optical character recognition system that can recognize an optical code from its printed value, or an RFID reading system that can read an electronic tag attached to the item, or other suitable technique of item identification, may be automatically employed to resolve the exception. In another example, a mechanical arm or other device may automatically push the object to the side of conveyors 30/32 (e.g., into an exception bin) for further/alternate handling. In another example, a visual indication can be generated by object annotation system 145 and displayed on the display of fixed device 72 or mobile device 80 as described in more detail below. When the exception is automatically resolved, the exception category identification information is stored in storage device 140. In one example, information corresponding to the way in which the exception was automatically resolved is stored in storage device 140.

The exception handling system 135 is configured to analyze the information stored in storage device 140 corresponding to resolution of the exception to determine whether to modify how future exceptions (e.g., future exceptions with the same category label) are to be resolved. For example, if a certain type of exception is being resolved manually and the operator ignores the exception most of the time (e.g., 70% of the time), the exception handling system 135 may decide to automatically ignore future exceptions of that type. In another example, if analysis of the information stored in data storage system 140 indicates that a high percentage of exceptions (e.g., 50% exceptions) are occurring for objects of a certain size, the exception handling system 135 can be automatically configured to ensure that exceptions corresponding to objects of that size are manually resolved.

Moreover, the information stored in storage device 140 may be analyzed to determine whether to improve other parts of system 10 including, for example, the conveyor system 30/32 (e.g., adjusting conveyor speed), the object measurement system 115 or the optical code reading system 12 (e.g., adjusting operational parameters of the image capture devices), the optical code intersection system 125, and/or the exception identification system 130 (e.g., adjusting the object separation criteria used to determine confidence of correct assignment of barcodes to objects). The information stored in storage device 140 may also be analyzed to detect certain patterns that may indicate ways in which customers and/or system operators attempt to compromise the system 10 (e.g., arrange objects in a certain manner to conceal one of them in order to obscure detection and avoid payment). The exception handling system 135 can then be programmed to pay particular attention to exceptions that may indicate that the system 10 is being compromised.

In another example, information stored in storage device 140 may be utilized to assist an operator (e.g., a store manager) in managing inventory files. For example, exception identification system 130 may identify that an optical code is associated with an object, but that the optical code has not been set up in the user's inventory file. An image of the object and the decoded information from the optical code may be stored in storage device 140 and used to notify the operator that the object and its associated optical code information need to be added to the operator's inventory file.

The portable device 80 may provide for various methods for handling exceptions. When an exception has been determined by the system, the exception handling system may send information to the portable device 80 notifying the operator that an item in the read zone was not successfully identified. In a multiple checkout station store having, for example, ten checkout stations, the notification may be as simple as signaling that there is a problem at checkout station #5. More information may be provided. For example, a digital photograph of the unsuccessfully read item (i.e., the exception item) may be sent to and displayed on the display of the portable device 80 (and/or the fixed display 72). The clerk 5 may manually manipulate the photograph on the touch screen display, rotating the item, and/or zooming in on or otherwise centering/focusing on a select optical code on the exception item. Once the image is manipulated to place the code in view, the clerk may either (1) prompt the device to attempt electronic processing/decoding of the manipulated image or (2) manually enter the code. The device 80 may have special optical code reading options/capabilities such as reverse image processing or color image processing (either automatically attempted or user initiated) that may, for example, be useful for processing reflective or certain color optical codes.

Alternately, examination of the photograph may reveal the nature of the exception to the operator. For example, in a volume exception, the system detects an object volume different than expected from the object identified via reading the barcode. A volume exception occurs in several instances such as two items (two cans of tuna fish) are stacked one on top of the other so the volume detected is twice as expected. Examining the photograph, the operator determines that there are two cans of the same tuna fish, and then action can be taken to tally both cans into the transaction for resolving the exception. Another exception is where an improper barcode label (from a less expensive item) is substituted over the label of a more expensive item. The photograph displayed may include annotated information both as to the barcode read, the volume expected, and potentially object recognition results allowing the operator to take appropriate action.

Alternately, in response to the exception notification, the clerk may approach the checkout station and resolve the exception whereby the device 80 displays a digital photograph of a region of the read zone thereby indicating a problem reading in a particular area (e.g., a small item such as a pack of gum 48 is obscured by an adjacent larger box of cereal 46). The attendant may also just "accept" the exception in the case of multiple barcodes where the image clearly shows the multiple barcodes are correct.

In another option, the exception system may, upon receiving input of the exception, analyze the exception and display a list of possible exception handling options on the display screen that the operator may simply select thereby resolving the exception: (1) ignore the exception; (2) display image of the object(s) for enabling resolving; (3) send message to user that the operator is en route to assist.

Methods may be employed in automated systems (e.g., via conveyor and portal data reader such as in FIG. 1) or as a semi-automatic retail self-checkout data reading systems (where objects are moved one at a time by the user into or through the read zone of the reader and the reader then reads the optical code on the object). One such method for an self-checkout system may comprise the steps of via a customer, presenting items through a read zone of a data reader;

via the data reader, identifying the item with the data reader by reading an optical code on the item;

via the system, capturing an image of the item as it is presented in the read zone;

via the system, determining if there is any exception to item identification and if there is an exception, sending the image of the item to a handheld device having a display screen and displaying the image on the display screen, wherein an operator employs the handheld device using the displayed image to resolve the exception.

The self-checkout system may further comprise gathering additional information on the item; performing an item check on the item by comparing the additional information gathered to the item identification from the optical code having been read; and annotating the image on the display with the additional information.

If the self-checkout lane is set up to allow the user to clear their own exceptions, the remote attendant/clerk could get a confirmation screen display of the exception and the proposed solution and accept or deny (and/or move to intervene). In such a method, the exception information may be displayed at the customer display screen 50 whereby the customer may manipulate the image on the screen and take an appropriate action in similar fashion to that described above taken by the attendant/clerk. The portable device 80 may also have the capability of controlling checkout station operation by remotely turning specific checkout lanes/stations on and off.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. An automated optical code reading and control system, comprising
 a portal data reader having a read zone;
 a conveyor system configured to automatically transport items into and through the read zone of the portal data reader, the portal data reader being operable to identify the items being transported through the read zone;
 an exception identification system operable to detect an exception item that has been transported into or through the read zone without being successfully identified by the portal data reader;
 a customer display and input device operable by the customer to receive exception information from the exception identification system pertaining to the exception item and to display certain exception information for allowing the customer to input a proposed solution for handling the exception item;
 a handheld display device operable by a clerk and including a display screen and being operable (1) to receive the exception information and the proposed solution and (2) to take input from the clerk to accept or deny the proposed solution for handling the exception item.

2. The system of claim 1 wherein the portal data reader includes an optical code reading system operable for reading optical codes on the items for identifying the items being transported through the read zone.

3. The system of claim 1 or 2 wherein the portal data reader includes an optical recognition system operable for identifying the items being transported through the read zone.

4. The system of claim 1 further comprising an imaging system operable for acquiring an image of the exception item, wherein the image is communicated to the handheld display device for display thereon.

5. The system of claim 1 further comprising an exception handling system, wherein the exception handling system is configured to receive feedback information produced in response to the clerk manually resolving the exception item via input to the handheld display device.

6. The system of claim 5 wherein the handheld display device comprises an optical code reader, wherein the handheld display device is operative to allow the clerk to resolve the exception item via reading an optical code on the exception item with the optical code reader.

7. The system of claim 5 wherein the display screen of the handheld display device comprises a touch screen, wherein the handheld display device is operative to receive a digital photograph of an entirety of the exception item and to allow the clerk to use the touch screen to manually manipulate the digital photograph of the exception item to focus on an optical code to enable at least one of manual or automatic reading of the optical code via the handheld display device.

8. The system of claim 1 wherein the certain exception information displayed on the customer display and input device comprises a list of one or more possible exception handling options that the customer may simply select for the proposed solution for handling the exception.

9. The system of claim 8 wherein the one or more possible exception handling options comprises ignoring the exception.

10. A method of operation for an automated data reading system, comprising the steps of
 moving, via a conveyor, items along an item path through a read zone of a portal data reader;

determining that an item is being transported through the read zone;

capturing an image of the item as it is moved along the item path and through the read zone;

attempting to identify the item with the portal data reader by reading an optical code on the item;

determining an exception to item identification if the portal data reader is unsuccessful in identifying the item;

sending exception information to a customer display and input device operable for receiving input from the customer of a proposed solution to the exception;

sending the exception information and the proposed solution to a handheld device having a display, wherein a clerk employs the handheld device to resolve the exception by accepting or denying the proposed solution.

11. A method of claim 10 wherein the step of determining an exception to item identification further includes attempting to identify the item with the portal data reader by using optical recognition to identify the item.

12. A method according to claim 10 wherein sending exception information comprises sending an image of the item to the handheld device and displaying the image on the display, wherein the display comprises a touch screen, wherein the clerk resolves the exception by manually manipulating the image on the touch screen to focus on an optical code, and prompting reading of the optical code.

13. A method according to claim 10 further comprising providing the handheld device with an optical code reader and resolving the exception by reading the optical code with the handheld device.

14. A method according to claim 10 wherein sending exception information to the customer display and input device comprises displaying a list of one or more possible exception handling options that the customer may simply select for the proposed solution for handling the exception.

15. A method according to claim 14 wherein the one or more possible exception handling options comprises ignoring the exception.

16. A method of operation for a retail self-checkout data reading system, comprising the steps of via a customer, presenting items through a read zone of a data reader;

identifying the item with the data reader by reading an optical code on the item;

capturing an image of the item as it is presented in the read zone;

determining if there is any exception to item identification and if there is an exception, sending the image of the item to a customer display and input device and displaying the image thereon, wherein the customer employs the customer display and input device using the displayed image to input a proposed solution to solve the exception;

sending the proposed solution to a handheld device having a display, wherein a clerk employs the handheld device to resolve the exception by accepting or denying the proposed solution.

17. A method according to claim 16 further comprising gathering additional information on the item;

performing an item check on the item by comparing the additional information gathered to the item identification from the optical code having been read;

annotating the image on the display with the additional information.

* * * * *

UNITED STATES PATENT AND TRADEMARK OFFICE
CERTIFICATE OF CORRECTION

Page 1 of 1

PATENT NO.         : 9,082,142 B2
APPLICATION NO.    : 13/737805
DATED              : July 14, 2015
INVENTOR(S)        : Michael P. Svetal It is certified that error appears in the above-identified patent and that said Letters Patent is hereby corrected as shown below:

In the specification

<u>Column 2</u>
Line 49, after "having" delete "has".

<u>Column 6</u>
Line 32, after "may" insert --be--.

<u>Column 8</u>
Line 2, before "70%" insert --≥--.
Line 7, before "50%" insert --≥--.

In the claims

<u>Column 12</u>
Line 20, change "solve" to --resolve--.

Signed and Sealed this
First Day of March, 2016

Michelle K. Lee
*Director of the United States Patent and Trademark Office*